United States Patent Office 3,333,939
Patented Aug. 1, 1967

3,333,939
DISCRETE FERTILIZER GRANULE CONTAINING A UREA COMPOUND, SULFUR AND A PHOSPHATE PLANT FOOD
Charles H. Davis and Walter L. Burns, Phoenix, Ariz., assignors to Arizona Agrochemical Corporation, a corporation of Arizona
Filed Apr. 5, 1965, Ser. No. 445,577
10 Claims. (Cl. 71—29)

This is a continuation-in-part of our co-pending application Ser. No. 363,139, filed Apr. 28, 1964 now abandoned.

This invention relates to novel granular fertilizers, to processes for preparing such fertilizers and to the use of such fertilizers. More particularly, the invention concerns fertilizers especially adapted for use in alkaline soils, to novel processes for preparing such fertilizers and to methods of increasing the plant food uptake rate in such soils.

In many areas of the United States, predominantly west of the 100th meridian, the soils are alkaline in nature, e.g., they contain sodium ion in amounts in excess of 15% of the total positive ion content of the saturated soil extract. The alkalinity of such soils introduces serious problems in the fertilization of crop plants since at the high pH levels encountered the uptake rate of conventional plant foods by growing plants is often materially lower than the uptake rate of such plants growing in neutral or acidic soils. For example, the uptake of nitrogen in the form of nitrate ion occurs most efficiently at a pH of about 6.5 to 7.5 and the uptake of phosphorous in the form of phosphate ion occurs most readily at a slightly acid pH of about 5.5 to about 7.0, most advantageously about 5.5. By contrast, however, in alkaline soils of a pH of upwards of 7.8 and higher the uptake rates of nitrogen and phosphorous are severely reduced. (All pH values mentioned herein are determined by the standard AOAC method using a Beckman potentiometer on the soil paste.)

In the past it has been proposed to remedy the problem of soil alkalinity by applying to the soil gross quantities of acidic material, e.g., solutions of sulfuric acid, calcium polysulfide, ammonium polysulfide and dry materials such as iron pyrite, ferric sulfate, gypsum and the like. However, this technique is not generally satisfactory since the acidic material is often rapidly leached away by surface water whereupon the soil reverts to its original alkaline character.

It has also been proposed that elemental sulfur be applied to the soil, which sulfur under the action of soil borne sulfofying bacteria is transformed over a period of time into acidic material. This approach has offered a partial solution in that the acidic material is made available over a longer period of time. However, the application of free elemental sulfur has not been a completely satisfactory general solution to the problem since very often the soil contains insufficient amounts of other materials necessary to the sulfofying process. This is particularly true in the hot, arid regions of the southwestern United States where the crop lands often lie unirrigated and exposed to rather high temperatures, which conditions are not conducive to the maintenance of a sufficiently high activity of sulfofying bacteria.

It has also been proposed that the bacteria population of the soil be promoted by applying to the soil various bacteria foods such as organic composts and the like in addition to sulfur and the usual applications of typical fertilizers such as ammonium phosphate fertilizers and the like. However, these techniques are rather cumbersome in that they involve the separate applications of several materials to the soils, usually at different times and further in that substantially the entire area of a crop field must be treated in this manner to insure the proper environment for the seeds and the plants grown therefrom.

We have now discovered novel fertilizer compositions especially adapted for use in alkaline soils. These novel fertilizers are discrete granules of a composition comprising a plant food and a food for acid-generating soil borne bacteria. These novel fertilizers provide, when applied to the soil in the locus of the seed and the plants grown therefrom, the proper localized environment of reduced pH required for more efficient plant food uptake rates by the seed and the plants from the granules.

The aforesaid novel fertilizer compositions can be used in alkaline soils to take advantage of the presence of any of the several types of acid-generating soil borne bacteria, for example, the so-called "sulfofying" bacteria which metabolize sulfur to $SO_2$, the so-called "carboniferous" bacteria which metabolize carbon to form $CO_2$, acetic acid, humic acid and the like, and the so-called "nitrobacter"-type bacteria which metabolize amino nitrogen or ammonia to $NO_3$. The $SO_2$ and $NO_3$ metabolism products hydrolyze in the presence of soil moisture to sulfuric and nitric acid.

Obviously, the type of bacteria food employed as a component of the novel fertilizer compositions will depend upon the type of bacteria present in the particular soil in question. Likewise the particular plant food employed in the novel fertilizer compositions will depend upon the character of the soil in question and may include any of the common plant food elements normally employed in mixed granulated fertilizers, for example, ammonium phosphate, either mono-ammonium phosphate or di-ammonium phosphate and mixtures thereof, potash, various trace minerals, chelated metals, etc.

It will be further understood that the term "food for acid-generating soil borne bacteria" includes both the substance which is metabolized to furnish the acid or acid-producing material (commonly termed the "energy" food) and the food which is metabolized by the bacteria for cell-building, reproduction and other bacteria invigorating and proliferation mechanisms (commonly called the "body-building" food). Thus, in a typical novel fertilizer as hereabove described, the bacteria food may comprise energy foods such as sulfur, carbon, amino compounds and the like and body-building foods which are organic compounds which decompose in moist soil to yield carbon dioxide, for example, urea, various urea compounds, proteins such as blood meal and fish meal, and fatty alcohols and the like.

A particularly preferred novel fertilizer composition comprises in the form of discrete granules a urea compound which decomposes in moist soil to yield carbon dioxide, sulfur, and a phosphate plant food. These compositions are preferred since they provide the highest possible ratios of available nitrogen and phosphorous plant food. In these preferred compositions the urea compound advantageously will be ureaphosphate obtained by the reaction of urea with phosphoric acid, and the phosphate plant food will typically be an ammonium phosphate, usually a mixture of mono-ammonium phosphate and di-ammonium phosphate. However, other urea compounds such as urea, and various adducts of urea with other organic compounds such as fatty alcohols and the like and salts of urea with other inorganic acids and with various organic acids such as fatty acids and the like may be successfully employed. Also, the phosphate plant food can also include phosphoric acid, and ammonia complexes of iron, manganese, zinc and similar metals with phosphoric acid. Typical urea phosphate-ammonium phosphate-sulfur compositions will comprise from 10 to 30 preferably 16–20 wt. percent urea phosphate, from 2 to 6 preferably 3–4 wt. percent sulfur, and the balance ammonium phosphate.

As used herein, the term "ureaphosphate' refers to the reaction product of urea, typically in an aqueous solution, with phosphoric acid, typically in the form of wet-process phosphoric acid. According to ultimate analysis of this compound taken in connection with various literature sources (e.g., Organic Chemistry, Morrison & Boyd, p. 692 (Allyn & Bacon 1959)) the empirical formula of urea phosphate is $CO(NH_2)_2$—$H_3PO_4$ and has the following structure

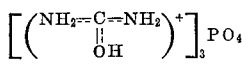

where the dashed lines indicate a resonance structure.

A prime novel feature of the invention which contributes importantly to the advantageous properties of the novel fertilizer compositions is the combination in intimate physical aggregation of the plant food and the bacteria food in a discrete unitary granule. This makes available, within and in the locus of the granule, the acid metabolism products of the acid-generating bacteria which produces a localized area of low pH which is conducive to improved plant food uptake rate, for example, by preventing the reversion of ammonium phosphate within the granule to the undesired tricalcium phosphate form. Thus, it is only necessary in order to achieve increased seed germination and plant growth rates that the novel granular fertilizers be disposed within the locus of the seed and the plant growing therefrom rather than treating the entire surface of the crop field with several separate components. Furthermore, for a given application rate the novel compositions herein described in the form of discrete granules give a significantly greater improvement in plant growth rate over that obtainable by the separate application of the components.

According to a further aspect of the invention, we have discovered novel and highly advantageous processes for preparing the novel fertilizer compositions, especially the preferred compositions containing urea phosphate, ammonium phosphate and sulfur. According to this preferred embodiment, the novel fertilizer is prepared by reacting urea with phosphoric acid to form a ureaphosphate reaction product, mixing ammonium phosphate and sulfur iwth the ureaphosphate reaction product and granulating the ureaphosphate-ammonium phosphate-sulfur mixture.

A better understanding of our invention may be obtained in view of the accompanying drawings in which.

Figure 1:
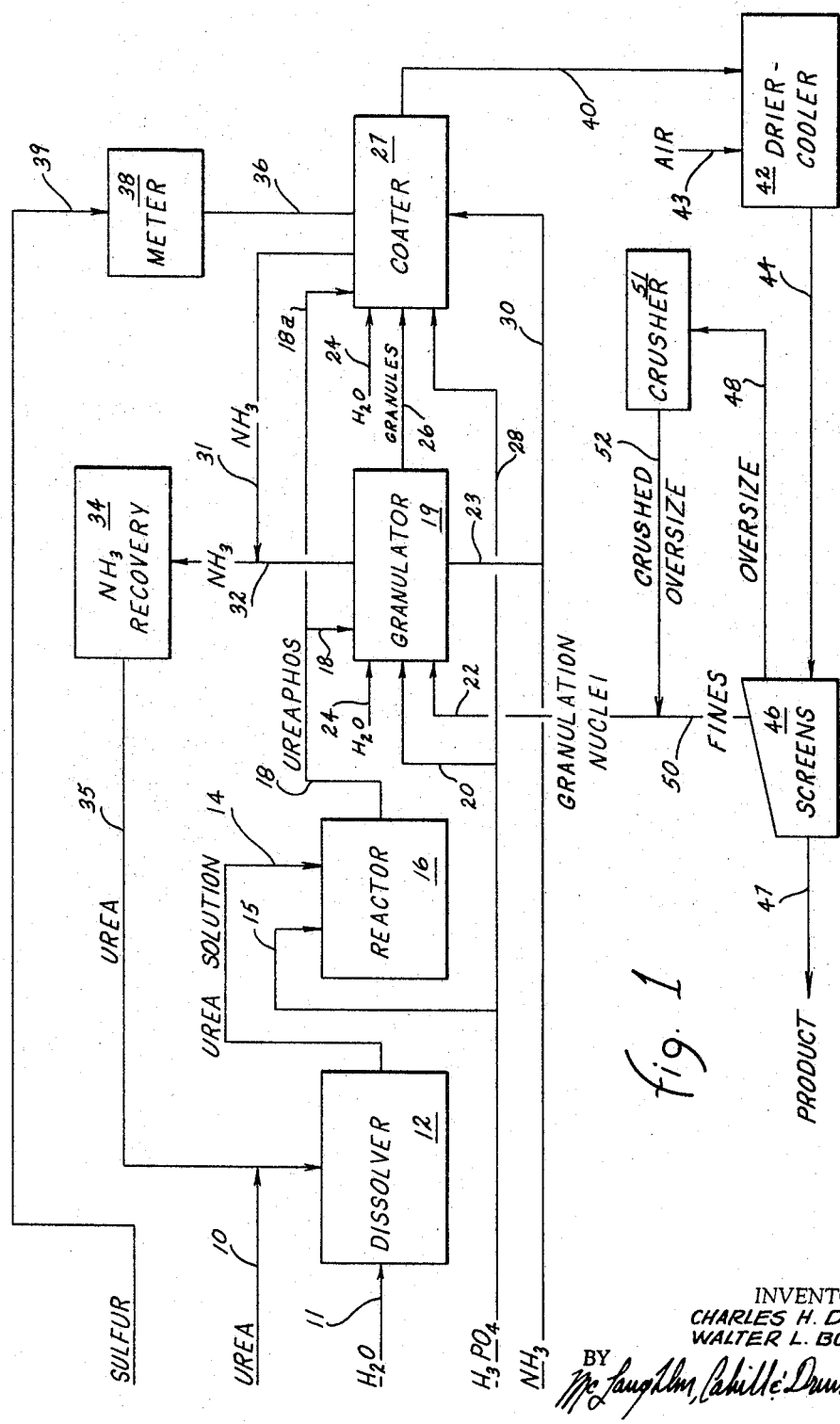
FIGURE 1 is a schematic representation of one embodiment of our process.

Referring now to the drawings, FIGURE 1 is a schematic representation of the process in an embodiment thereof comprising reacting urea with phosphoric acid to form ureaphosphate, mixing the ureaphosphate with ammonium phosphate to form discrete granules of the mixture and coating the discrete granules with sulfur.

In FIGURE 1 a feed stream of urea 10 is dissolved by a water stream 11 in a dissolver 12 suitably with agitation and heating to form a urea solution stream 14 which is fed along with a phosphoric acid stream 15 to a reactor 16 to produce an aqueous solution of urea phosphate. This reaction is advantageously carried out at an elevated temperature, suitably above 180° F. and advantageously employing a stoichiometric excess of phosphoric acid, suitably at least 10–20% stoichiometric excess. A stream of the ureaphosphate solution in aqueous phosphoric acid 18 is fed to a granulation zone 19, suitably a rotating drum granulator, along with feed streams of phosphoric acid 20 and granulation nuclei 22. The phosphoric acid in the ureaphosphate solution and in the phosphoric acid feed stream and a feed stream of ammonia 23 provide a reaction mixture of ammonia and phosphoric acid in the granulation zone which is contacted with the ureaphosphate solution and with the granulation nuclei to form discrete granules comprising ureaphosphate and ammonium phosphate in the granulator. The various feed streams including a water stream 24 are controlled as to rate, temperature, and composition to provide granulation conditions of temperature, moisture and residence time within the granulation zone according to art-recognized techniques to provide for the formation of discrete granules in the granulator which are fed in a stream 26 to a coater 27 which may be a separate vessel as shown or may be an extension of the granulator. Where a separate coater is employed, a further stream of ureaphosphate 18a and a further reaction mixture of ammonia and phosphoric acid may be contacted with the granules, this reaction mixture being provided by phosphoric acid stream 28 and ammonia stream 30. Again, as in the case of the granulator, the conditions of moisture, temperature and residence time are controlled within the coater to provide discrete granules comprising ureaphosphate and ammonium phosphate. If an excess of ammonia is fed through the granulator and coater to promote substantially complete conversion of the phosphoric acid to ammonium phosphate, the excess ammonia may be recovered through ammonia recovery lines 31 and 32 and fed to an ammonia recovery unit 34 for conversion according to known methods to a stream of urea 35 which is recycled to the dissolver 12. The ammonia recovery unit can be any of the known urea production units utilizing ammonia and $CO_2$ as raw materials, e.g., the processes described in Chemical Engineering, p. 86 (December 1959) or in Chemical Processing p. 19–23 (September 24, 1962). Within the coater 27 the discrete ureaphosphate-ammonium phosphate granules are coated with sulfur by contacting the discrete granules with a molten sulfur stream 36 provided from a sulfur melter 38 fed by sulfur feed stream 39. The sulfur is advantageously introduced into the coater as a liquid under pressure which is sprayed onto the surface of the ureaphosphate-ammonium phosphate granules, which spray then coalesces disposing sulfur upon the surfaces of these granules. Alternatively, the sulfur can be introduced as a solution of ammonium polysulfide (nitrosul).

The sulfur-coated granules are then fed in a stream 40 to a drier-cooler 42 where they are contacted with an airstream 43 to remove excess moisture and cool the granules. The cooled stream of granules 4 is then separated by screens 46 into a product-size fraction 47, an oversize fraction 48 and an undersize fraction 50. The oversize stream 48 is fed to a crusher 51 which reduces the oversize granules to a size approximating that of the undersize particles and the stream of crushed oversize particles 52 and the stream of undersize product 50 are recycled as granulation nuclei to the granulating zone.

Figure 2:
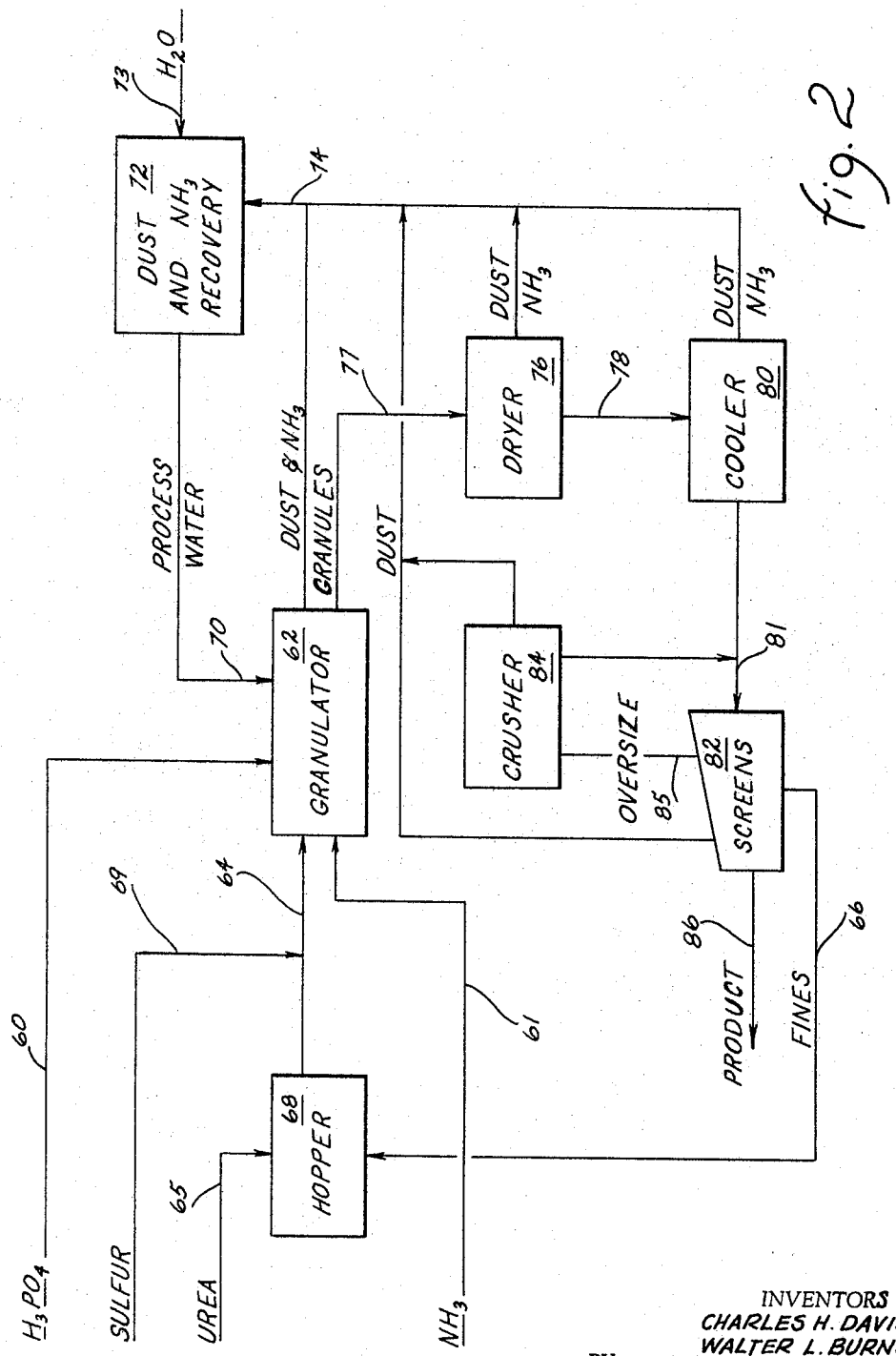
FIGURE 2 is a schematic representation of another embodiment of our process.

Refering to FIGURE 2, phosphoric acid and ammonia are fed by means of feed streams 60 and 61, respectively, to a granulator 62 which may be of the type hereinbefore described. A stream 64 containing sulfur, urea, and granulation nuclei is also fed to the granulator 62. Urea from stream 65 and fines or granulation nuclei from stream 66 are fed into a hopper 68 and admixed therein. Sulfur from stream 69 is mixed with the urea-granlation nuclei mixture to form stream 64. Sulfur, urea, and granulation nuclei are in the dry form when mixed to form feed stream 64. Phosphoric acid fed to the granulator in stream 60 is usually of the type generally designated as "wet process green phosphoric acid" containing an equivalent 52 percent $P_2O_5$.

Reaction in the granulator takes place at temperatures of from about 170 to about 220 degrees Fahrenheit with temperatures of from about 190 to about 220 degrees Fahrenheit being preferred. The product obtained from the granulator is an intimate admixture of ureaphosphate, ammonium phosphate, and sulfur, substantially as hereinbefore described except that the sulfur produced by the process of FIGURE 2 is disbursed in the granules. Reactants are usually fed to the granulator at ambient temperatures, the heat of reaction being sufficient to maintain the reactants at the appropriate reaction temperatures. Temperature and pelleting control are facilitated by the introduction of water to the granulator 62 by means of stream 70. Water added to the granulator by means of stream 70 is ordinarily referred to as "process water." Proces water is obtained from the dust recovery and ammonia recovery units 72 to which water is usually added by means of stream 73 and which usually form a part of the process but are not required.

The amount of water added to the granulator helps maintain temperatures therein from becoming too high and thereby causing decomposition of the reactants or products or otherwise deleteriously affecting the process. If insufficient water is added to the reaction mixture in the granulator, the product granules are too fine for practical use. If excess water is added, the granules become sufficiently large that substantially all the product granules must be passed through a crusher to obtain a useful product size.

Dust and ammonia vapors from the granulator are directed to the dust and ammonia recovery units through suitable venting means 74. Granules produced in the granulator ordinarily contain water and are directed to a dryer 76 by means of stream 77. Dust, ammonia and water vapor from the dryer is also vented to the dust and ammonia recovery units by means of stream 74. Drying is ordinarily carried out at temperatures of from about 170 to about 190 degrees Fahrenheit, with a drying temperature of 180 degrees Fahrenheit being preferred. Stream 78 directs the dried granules to a cooler 80 where the temperature of the granules is generally reduced to about 140 degrees Fahrenheit. Residual dust and ammonia is vented to the recovery units.

Cooled granules are directed by appropriate means 81 to a set of screens 82 wherein oversize particles and fine materials are separated from the product-size granules. Oversize granules are directed to a crusher 84 by stream 85 where their size is reduced and they are returned to stream 81 to be further screened. Dust from the screens and crusher is also vented to the dust recovery unit. Product withdrawn from the screens is transported by appropriate means forming stream 86 to bins, bags, hoppers or other receptive means. The size of the product granules may be controlled as closely as desired by employing appropriate screening means and by controlling the amount of water added to the granulator.

Fine materials withdrawn from the screens 82 are transported in stream 66 as hereinbefore discussed and function as granulation nuclei when added to the input reactants introduced to the granulator.

Figure 3:
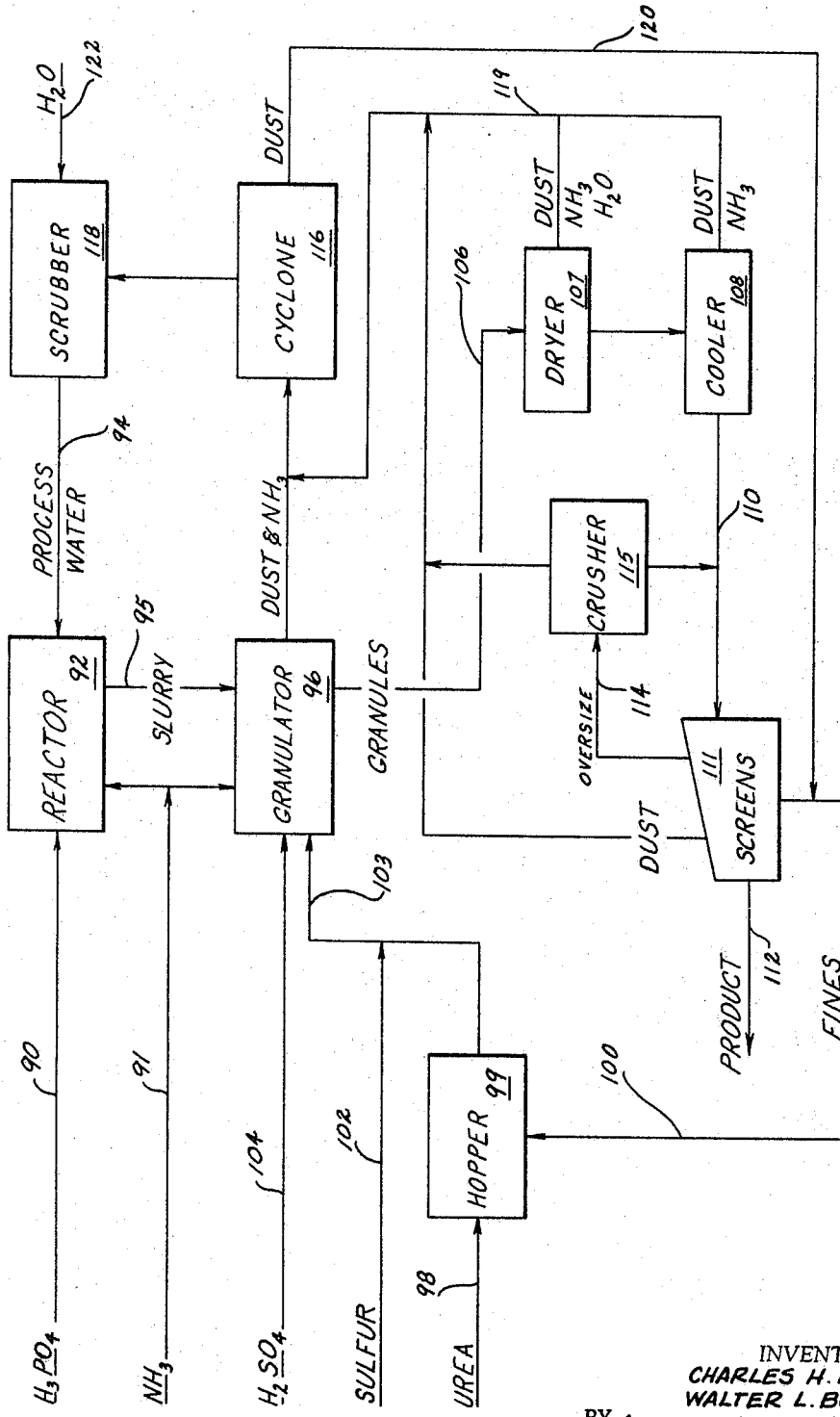
FIGURE 3 is a schematic representation of a further embodiment of our process.

Referring to FIGURE 3, another modification of the process is illustrated. Phosphoric acid and ammonia are fed by streams 90 and 91 to a reactor 92 and at least partially react to produce ammonia phosphate with an excess of phosphoric acid being present. Process water from stream 94 is added to the reactor to control the temperature in the reactor and as a means of addition of water to the process generally. Temperatures in the reactor are maintained at from about 220 to about 230 degrees Fahrenheit. The slurry produced in the reactor has a specific gravity of from about 1.51 to about 1.56 and is introduced by stream 95 to the granulator 96. Urea is introduced by stream 98 to a hopper 99 where it is mixed with fines which serve as granulation nuclei from stream 100. Sulfur is introduced from stream 102 to the mixture of urea and granulation nuclei in stream 103 and stream 103 is introduced to the granulator 96. Ammonia is also introduced to granulator 96 by stream 91 for further reaction with excess phosphoric acid from the reactor 92.

Sulfuric acid in small amounts is introduced to the granulator 96 by stream 104. The sulfuric acid is not essential to operation of the process but adds to the heat of reaction and thereby affords a certain amount of temperature control and also improves the solubility of the urea and its reaction with phosphoric acid. Addition of small amounts of sulfuric acid also tends to improve the rate of granule production from the granulator. Usually, an amount of about 100 pounds of 98 percent sulfuric acid per ton of granules produced is adequate to obtain the hereinbefore enumerated benefits.

Temperatures in the granulator are desirably maintained at from about 170 to about 220 degrees Fahrenheit and preferably from about 190 to about 220 degrees Fahrenheit. Higher temperatures may cause decomposition or other deleterious effects and are to be avoided, whereas temperatures which are too low may inhibit or suppress reaction with a consequent lowering in the rate of production and in the quality of the product.

Water is added to the reactants in the granulator by means of the process water stream 94 which is introduced to the reactor 92. Excess water causes large, difficult to dry, granules whereas too little water may cause undue fineness or dusting in the granules produced.

Granules formed in the granulator are discharged through stream 106 to a dryer 107 which is maintained at a temperature of about 180 degrees Fahrenheit. Dried granules are cooled in a cooler 108 to a temperature of about 140 degrees Fahrenheit and are then transported in stream 110 to a set of screens 111. Product-size granules are withdrawn from the screens 111 in stream 112 and appropriately transported or stored as desired. Oversize particles are transported by stream 114 to a crusher 115 where their size is reduced and the crushed granules are returned to stream 110 for further screening. Dust, water and ammonia fumes from the granulator, dryer, cooler, crusher and screens are vented to appropriate cyclone and scrubber means 116 and 118 by vents or conduits forming stream 119. Dust recovered from the cyclone means 116 is introduced by stream 120 to the fines recovered from the screens 111 and introduced to the hopper 99 by stream 100 and thereby form a part of the granulation nuclei introduced to the granulator 96. Water introduced by stream 122 to the scrubber means 118 becomes the process water introduced to the reactor 92 and carries ammonia and process dust. Water introduced to the scrubber means may also have a certain amount of acid such as sulfuric acid to facilitate scrubbing and such acid will be carried as a part of the process water with no deleterious effect.

Product granules formed in the process outlined in FIGURE 3 contain an intimate admixture of ammonium phosphate, ureaphosphate and sulfur in the desired ratios. The sulfur is substantially unreacted but is intersperced throughout the individual particles.

For the better understanding of our invention we present the following examples of the manufacture and use of the preferred novel fertilizers of the invention.

*Example 1*

The apparatus of FIGURE 1 is employed to produce a nominal 15–45–0–5 granular fertilizer of the type hereabove described.

Table A shows the steady state flow rates and process conditions employed.

TABLE A

| Stream | Rate, lb./hr. | Temp., °F. | Composition, weight percent | Remarks |
|---|---|---|---|---|
| Ammonia: | | | | |
|   Feed to Granulator | 900 | | } 98+wt. percent $NH_3$ | 150 p.s.i.g. |
|   Feed to Coater | 300 | | | |
| Phosphoric Acid: | | | | |
|   Feed to Reactor | 735 | | } 55% $P_2O_5$ equiv | Wet process phosphoric acid. |
|   Feed to Granulator | 4,700 | | | |
|   Feed to Coater | 1,500 | | | |
| Urea: | | | | |
|   Recycle from $NH_3$ Recovery | 120 | | } 99+wt. percent urea | If no $NH_3$ recovery system feed 800 lb./hr. fresh urea. |
|   Makeup feed | 680 | | | |
| Sulfur: Feed to Coater | 400 | 300 | 99+wt. percent sulfur | Delivered as molten spray. |
| Water: | | | | |
|   Feed to Dissolver | 1,200 | 190 | | |
|   Feed to Granulator | (*) | Ambient | | |
|   Feed to Coater | (*) | do | | |
| Ureaphosphate: Feed to Reactor | 1,155 | 185 | As 30% soln. in aqueous phosphoric acid | |
| Dry Flows: | | | | |
|   Drier Effluent | 40,000 | 145 | } Product+Oversize+Fines, 14.48-47.40-0-4.68 ($H_2O$=3.65 wt. percent). | Mesh to mesh. |
|   Product | 8,000 | | | |
|   Oversize | 4,000 | | | |
|   Fines | 28,000 | | | |
|   Recycle | 32,000 | | | |

*As required for maintaining granulation conditions.

The product is in the form of discrete granules containing ureaphosphate, ammonium phosphate, sulfur and moisture. The product is essentially non-hygroscopic and is free-flowing and essentially non-caking.

*Example II*

The product of Example I is applied by broadcast sowing test plots of alkaline soil at a rate of 300 lb./acre for a barley test plot and at a rate of 400 lb./acre for a lettuce test plot. Control test plots for each crop are prepared by broadcasting 600 lb./acre of 15-45-0 mechanically mixed with 5 wt. percent sulfur.

Upon harvesting these crops the plots fertilized with the granulated fertilizer of Example I yield 15 percent more barley per acre and 18 percent more lettuce per acre than the plots fertilized with the mechanical mixture.

If the plots are side-dressed instead of broadcast the difference in crop yields is even more pronounced. Crops side-dressed with the mechanical mixture produce approximately equivalent yields to crops fertilized by broadcasting the same amounts of the novel granulated fertilizers hereabove described.

*Example III*

The apparatus described in connection with FIGURE 3 is employed to produce a nominal 14-45-0-3 fertilizer in granular form.

Table B sets forth steady state flow rates and process conditions employed. Reactants in the reactor were maintained at temperatures of about 220 to 230 degrees Fahrenheit and the contents of the granulator were maintained at about 210 to 220 degrees Fahrenheit. Drying temperature was about 180 degrees Fahrenheit.

Product was in the form of free-flowing, non-caking granules containing ureaphosphate, ammonium phosphate and sulfur in intimate admixture and was produced at a rate of about seven tons per hour.

*Example IV*

Employing the rates and conditions set forth in Table B of Example III, a 14-45-0-3 fertilizer substantially as therein described may be produced by the process as represented in FIGURE 2 wherein reactants are introduced directly to the granulator without benefit of pre-neutralization in a separate reactor. Temperatures of materials in the granulator are maintained at from about 190 to about 220 degrees Fahrenheit.

*Example V*

Tests substantially as described in Example II are carried out employing the 14-45-0-3 fertilizer of Examples III and IV with substantially the same excellent results.

Various modifications may be made in our invention without departing from the spirit or scope thereof and it is to be understood that we limit ourselves only as defined by the appended claims.

We claim:

1. The process for preparing a fertilizer for use in alkaline soils comprising in combination the steps of:
   (a) reacting urea with phosphoric acid to form ureaphosphate;
   (b) mixing said ureaphosphate with ammonium phosphate to form discrete granules of the mixture; and
   (c) coating said discrete granules with sulfur.

2. A continuous process for preparing a granular fertilizer for use in alkaline soils comprising in combination the steps of:
   (a) reacting an aqueous urea solution with phosphoric acid to form an aqueous solution of ureaphosphate;
   (b) contacting said ureaphosphate solution with granulation nuclei and a reaction mixture of ammonia and phosphoric acid in a granulation zone under granulation conditions to form discrete granules comprising ureaphosphate and ammonium phosphate;
   (c) contacting said discrete granules with molten sulfur to dispose sulfur on the surfaces thereof;
   (d) drying and cooling the sulfur-contacted granules;
   (e) separating the dried cooled granules into a product size fraction, an oversize fraction and an undersize fraction;

TABLE B

| Stream | Rate, lb./hr. | Temp., °F. | Composition, weight percent | Remarks |
|---|---|---|---|---|
| Ammonia: | | | | |
|   To Reactor | 1,050 | Ambient | 98+wt. percent $NH_3$ | Anhydrous. |
|   To Granulator | 1,050 | do | 98+wt. percent $NH_3$ | Do. |
| Phosphoric Acid: To Reactor | 12,131 | do | 52% $P_2O_5$ equiv | Wet process green phosphoric acid. |
| Process Water: To Reactor | 3,500 | do | | From ammonia scrubber and dust scrubber. |
| Sulfuric Acid: To Granulator | 700 | do | 98 wt. percent $H_2SO_4$ | Optional. |
| Urea: To Granulator | 630 | do | 99+wt. percent urea | Could be introduced in whole or part to reactor. |
| Sulfur: To Granulator | 420 | do | 99+wt. percent sulfur | Finely divided. |

(f) crushing the oversize fraction; and
(g) recycling granulation nuclei to the granulation zone, said granulation nuclei comprising undersize granules and crushed oversize granules.

3. A continuous integrated process for preparing a granular fertilizer for use in alkaline soils comprising in combination the steps of:
   (a) reacting an aqueous solution of urea at a temperature of at least about 180 degrees Fahrenheit with a stoichiometric excess of wet-process phosphoric acid to produce a solution of ureaphosphate in aqueous phosphoric acid;
   (b) contacting said ureaphosphate solution in a rotating drum granulator with a bed of granulation nuclei in the presence of a reaction mixture of ammonia and wet-process phosphoric acid, the ammonia being present in the granulator in a stoichiometric excess of the amounts required to convert substantially all of the phosphoric acid therewithin to ammonium phosphate, said contacting being carried out under granulating conditions of temperature, moisture content, and contact time, thereby to produce discrete granules comprising ureaphosphate and ammonium phosphate;
   (c) spraying molten sulfur upon the surfaces of said discrete granules to dispose sulfur thereupon;
   (d) drying and cooling the sulfur-bearing discrete particles;
   (e) separating the dried cooled particles into a product-size fraction, an oversize fraction and an undersize fraction;
   (f) crushing the oversize fraction;
   (g) recycling granulation nuclei to the granulator, said granulation nuclei comprising crushed oversize granules and undersize granules;
   (h) recovering the excess ammonia from the granulator, converting the excess ammonia to urea and recycling the thus produced urea to the ureaphosphoric acid reaction of step (a).

4. A fertilizer for use in alkaline soils, said fertilizer being in the form of discrete granules, substantially each of which granules includes:
   (a) a fertilizing quantity of plant food selected from the class consisting of ammonium phosphate and potash;
   (b) a bacteria energy food selected from the class consisting of sulfur and carbon, in an amount sufficient when metabolized by soil-borne bacteria to reduce the alkalinity of said soil; and
   (c) a bacteria body building food which decomposes in moist soil to yield carbon dioxide, selected from the class consisting of a urea compound, blood meal, fish meal and fatty alcohols, in an amount sufficient to promote invigoration and proliferation of soil-borne bacteria.

5. A fertilizer for use in alkaline soils in the form of discrete granules of a composition comprising:
   (a) ureaphosphate in an amount to provide sufficient carbon dioxide food for soil-borne sulfofying bacteria to promote invigoration and proliferation of said bacteria;
   (b) sulfur in an amount sufficient to provide, under the metabolizing action of the sulfofying bacteria, a pH within and in the locus of the granule which is substantially lower than the pH of the surrounding soil; and
   (c) ammonium phosphate plant food.

6. A fertilizer for use in alkaline soils in the form of discrete granules of a composition comprising from 10 to 30 weight percent ureaphosphate, from 2 to 6 weight percent sulfur, and the balance ammonium phosphate.

7. The method of promoting the growth of plants in alkaline soils which comprises applying to the locus of the seed and plants grown therefrom a fertilizer in the form of discrete granules, substantially each of which granules includes:
   (a) a fertilizing quantity of plant food selected from the class consisting of ammonium phosphate and potash;
   (b) a bacteria energy food selected from the class consisting of sulfur and carbon, in an amount sufficient when metabolized by soil-borne bacteria to reduce the alkalinity of said soil; and
   (c) a bacteria body building food which decomposes in moist soil to yield carbon dioxide, selected from the class consisting of a urea compound, blood meal, fish meal and fatty alcohols, in an amount sufficient to promote invigoration and proliferation of soil-borne bacteria.

8. The method of promoting the growth of plants in alkaline soils which comprises applying to the soil in the locus of the seed and plants grown therefrom a fertilizer in the form of discrete granules of a composition comprising a phosphate plant food, sulfur and a urea compound which in contact with moist soil decomposes to yield carbon dioxide.

9. The method of promoting the growth of plants in alkaline soils which comprises applying to the soil in the locus of the seed and plants grown therefrom a fertilizer in the form of discrete granules of a composition comprising:
   (a) ureaphosphate in an amount to provide sufficient carbon dioxide food for soil-borne sulfofying bacteria to promote invigoration and proliferation of said bacteria;
   (b) elemental sulfur in an amount sufficient to provide under the action of the soil-borne sulfofying bacteria, a pH within and in the locus of each granule which is substantially lower than the pH of the surrounding soil; and
   (c) an ammonium phosphate plant food.

10. The method of improving the phosphate uptake rate from granular phosphate fertilizers by plants growing in an alkaline soil comprising including within the granules elemental sulfur and ureaphosphate, whereby in contact with moist soil containing sulfofying bacteria the ureaphosphate decomposes yielding carbon dioxide food for said bacteria thereby causing the invigoration and proliferation of said bacteria which metabolize the sulfur to $SO_3$, which $SO_3$ in combination with soil moisture produces a reduced pH in the locus of the fertilizer granule thereby promoting the phosphate uptake rate from said granules.

References Cited
UNITED STATES PATENTS

| | | | |
|---|---|---|---|
| 1,883,718 | 10/1932 | Grether | 71—29 |
| 1,951,518 | 3/1934 | Meiser et al. | 71—29 |
| 3,206,297 | 9/1965 | O'Connor | 71—64 X |
| 3,241,946 | 3/1966 | Young | 71—43 |

OTHER REFERENCES

Tisdale, S. L. and W. L. Nelson: Soil Fertility and Fertilizers, The Macmillan Co., New York, 1960, pp. 97–100.

DONALL H. SYLVESTER, *Primary Examiner.*

R. BAJEFSKY, *Assistant Examiner.*